United States Patent Office 2,824,241
Patented Feb. 18, 1958

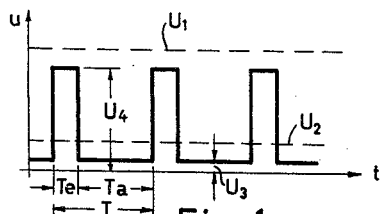
Fig. 1a
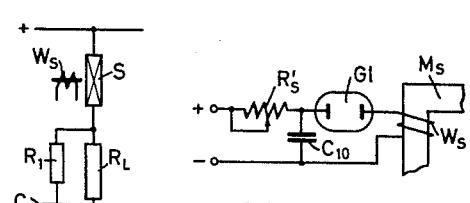
Fig. 2  Fig. 2b
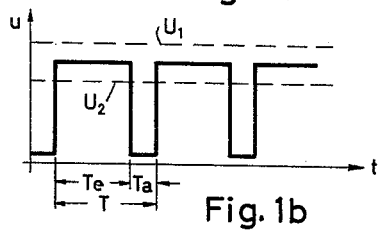
Fig. 1b
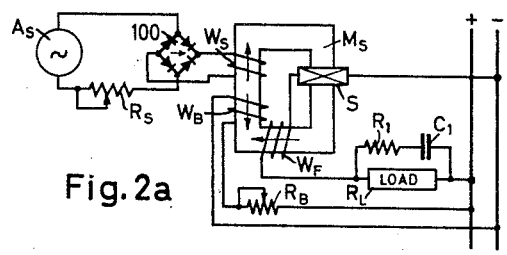
Fig. 2a
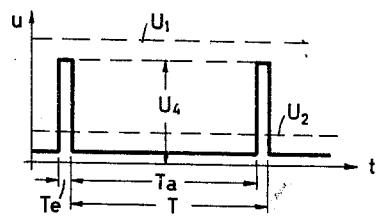
Fig. 1c
Fig. 1d
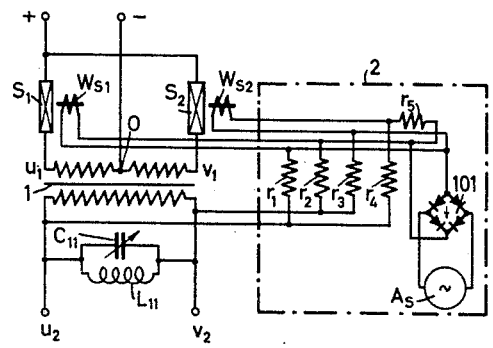
Fig. 4
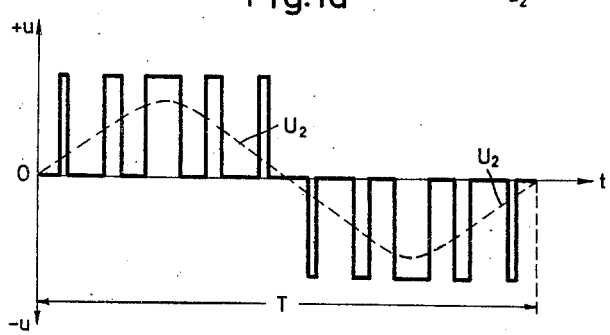
Fig. 3
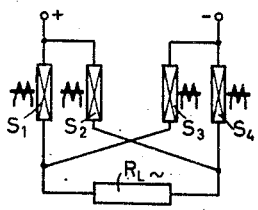
Fig. 5

2,824,241

ELECTRIC POWER TRANSLATING APPARATUS OF LOW LOSSES AND LOW WATTLESS POWER

Wilhelm Kafka, Tennenlohe, near Erlangen, and Georg Sichling and Manfred Tschermak, Erlangen, Germany, assignors to Siemens-Schuckertwerke Aktiengesellschaft, Erlangen, Germany, a corporation of Germany Application April 5, 1955, Serial No. 499,416

Claims priority, application Germany April 7, 1954

19 Claims. (Cl. 307—149)

Our invention relates to electric apparatus for translating voltages and currents for electric power distribution and consuming systems and has for its general object to afford a voltage or current translating operation of minimum losses and minimum wattless power.

In electric power engineering there is often the requirement to translate voltages or currents, for example, for such purposes as:

(a) The conversion of low direct voltage into a higher direct voltage for feeding appliances from batteries, (b) The inversion of low direct voltage into a higher alternating voltage for operating fluorescent lamps from vehicle batteries, (c) The change of alternating voltage into another alternating voltage of controllable frequency for operating variable-speed motors of the wound-rotor and synchronous types, or (d) The conversion of alternating line voltage into controllable alternating voltage of variable amplitude such as obtainable by means of a variable transformer.

Translating operations of this kind are desired to incur only moderate wattage losses and to avoid placing an appreciable wattless power demand upon the feeder line. This can be achieved with the aid of dynamoelectric machines; but for many applications such rotating machines are undesired. Certain translating operations, in principle, are also possible with magnetic amplifiers or gaseous discharge devices, although magnetic amplifiers are applicable for currents and voltages of only one direction unless appreciable additional losses are to be permitted. In any event, magnetic amplifiers and gaseous tubes when used in alternating-current systems for voltage or power regulation, such as by the delayed commutation method, impose a relatively large wattless load upon the alternating-current feeder line.

It is, therefore, a more specific object of our invention to provide power translating apparatus which is capable by means of static devices to translate power-current voltages of any kind and any wave shape at low wattage losses and with a more favorable power factor than heretofore attained with static translating means.

To this end, and in accordance with a feature of our invention, we connect into the circuit of the input voltage one or more rapidly acting switching members and, by means of these members, chop the input voltage at the rhythm of a fixed or changing control frequency into individual voltage sections; and we adjust the ratio of the make and break intervals of the switching members so as to control the median values of the individual voltage section in accordance with the desired time curve of the output voltage. Preferably, we further provide filter means for suppressing the upper harmonics resulting from the chopping operation.

According to a more specific feature of our invention, the above-mentioned switching members consist of semiconductor devices of controllable resistance and are controlled to abruptly vary their resistance between minimum and maximum limits in synchronism with the control frequency.

According to still another feature of the invention, the voltage-chopping switching members of the translating system consist of magnetically responsive semiconductor devices equipped with a magnet structure in whose field the semiconductor member is disposed and which has field windings for controlling the strength and/or polarity of that field.

Although in communication engineering the chopping principle has been employed for modulating purposes, for instance to minimize interference in message transmission, the invention is based upon the recognition that, by virtue of the means herein disclosed, a chopping method is also applicable for the translation of electric power in distribution systems of utilities, with the advantage of not only reducing power losses, but also the wattless load imposed upon the feeder line. That is, the invention relates to the voltage or current translation of the power supplied to consumer's equipment for which, aside from securing a desired performance, it is a decisive requisite for the practical application of such translating apparatus to also secure good economy and efficiency as well as a satisfactory power factor.

The variation in ratio of make and break intervals, corresponding to the median value of the output voltage to be formed, can be effected by varying the width (i. e. duration) of the voltage sections and/or by varying the chopping frequency. For instance, when chopping a direct voltage at a given constant frequency, the width of the resulting voltage sections can be changed periodically from zero to a maximum and thereafter back to zero. This results in translating the input voltage into median value corresponding to the half-wave of an alternating current. When thereafter the direct voltage is reversed in polarity and the method is repeated, a second alternating-current half-wave of reversed direction is obtained. It will be recognized, therefore, that the method is suitable for converting direct voltage into alternating voltage.

If the chopping device used were ideal so that it had no interior resistance thus completely interrupting its circuit within infinitesimal time, then the chopping operation would not involve any wattage losses at all. The subsequent formation of a median voltage value would require smoothing by reactive components, such as capacitances or inductances, which involve a wattless load; but such filtering means become smaller with a higher chopping frequency.

The switching devices now available fall short of providing the just-mentioned ideal chopping operation. Although mechanical chopping devices interrupt the circuit completely and have no appreciable residual resistance when the mechanical contact is closed, such contacts are subjected to considerable wear so that their useful life is rather limited. Besides, mechanical interrupters are not suitable for higher frequencies. For both reasons such interrupters are not applicable for attaining the objects of the present invention. Gaseous tubes are not applicable because they are incapable of interrupting the plate current other than by natural extinction of the instantaneous current itself. In principle, high-vacuum tubes are applicable, but they are mechanically sensitive and when conducting have a residual resistance so high as to cause several percent of voltage drop. In contrast, the above-mentioned semiconductor devices are particularly well suitable for the chopping method according to the invention. They are controllable sufficiently abruptly to change their resistance from maximum to minimum, and vice versa, the ratio between maximum and minimum resistance being very high.

Among the just-mentioned semiconductors and particularly suitable for the purposes of the invention are the symmetrically conducting and magnetically controllable semiconductors of high character mobility, that is semiconductors whose carrier mobility is about 6000 cm.$^2$/volt sec. or more, and also asymmetrically conducting semiconductors of the magnetic barrier type.

The suitable semiconductors of high carrier mobility comprise those of the type $A_{III} B_V$, that is compounds of any one of the elements boron, aluminum, gallium, indium in the third group (subgroup B) of the periodic system with any one of the elements nitrogen, phosphorus, arsenic, antimony in the fifth periodic group (subgroup B). Semiconductors of this type, having greatly increased resistance when subjected to a magnetic field, are described in the copending applications Serial No. 275,785, filed March 10, 1952, and Serial No. 391,647, filed November 12, 1953, both assigned to the assignee of the present invention.

Semiconductors of the magnetic barrier type, of which intrinsically conducting and surface-treated germanium is preferably applicable, are likewise distinct by a relatively low electric resistance which, by applying a magnetic field of a given direction and of sufficient strength, can be increased to a very high value in a given direction of current conductance. The high asymmetrical resistance of these semiconductors can be wholly or partially eliminated by an additional applied electric field or by radiation of a given direction. Semiconducting resistors exhibiting the magnetic barrier-layer effect are described in the copending applications Serial No. 297,788, filed July 8, 1952, Serial No. 462,516, filed October 15, 1954; and Serial No. 495,007 filed March 17, 1955, all assigned to the assignee of the present invention.

Other types of controllable semiconducting resistors, for instance transistors, preferably of the junction-type, and other very rapidly operating switching members of similar switching properties are suitable for the invention provided they are capable of chopping a voltage without appreciable losses at the required frequency.

The foregoing and more specific objects, advantages and features of the invention will be apparent from and will be set forth in, the following description with reference to the embodiments of the invention illustrated on the drawing in which:

Figs. 1a to 1d show voltage characteristics explanatory of apparatus for translating high direct voltage into low direct voltage.

Fig. 2 shows schematically the circuit diagram of the simplest form of such translating apparatus.

Fig. 2a shows schematically the circuit diagram of another such translating apparatus, and Fig. 2b shows a modified portion of an otherwise similar apparatus.

Fig. 3 is a schematic voltage-time diagram exemplifying the translation of direct current into alternating current.

Figs. 4 and 5 show two different circuit diagrams of apparatus operating in accordance with the principle of Fig. 3.

Fig. 10 represents a voltage diagram explanatory of another frequency changing system; and Fig. 11 is a schematic circuit diagram of that system.

Figs. 12, 13, 14 and 15 are explanatory voltage-time diagrams relating to an operation similar to that represented by Fig. 10 but involving voltage control by variable part-time conductance.

Fig. 16 illustrates a voltage-current characteristic of the flip-flop type as exhibited by semiconductor devices preferably applied in apparatus according to the invention; and Fig. 17 is a coordinate diagram exemplifying the ignition and extinction voltages of such a device.

Figs. 18 to 20 show schematic circuit diagrams of different translating apparatus equipped with auxiliary component circuits for reducing the transition losses in the switching member, these auxiliary circuits being generally applicable with any of the embodiments of the invention.

Figure 6A:
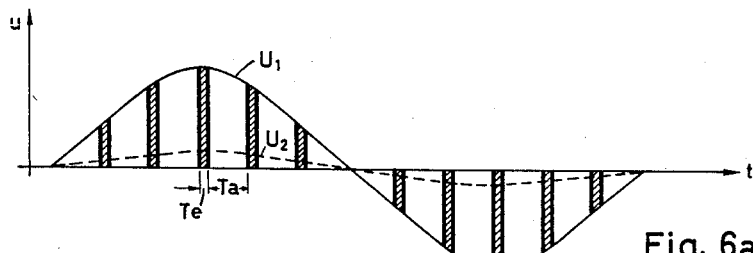
Figs. 6a and 6b show coordinate diagrams of voltage curves relating to a translating operation for controlling the amplitude of an alternating voltage.

Consider first the case of converting a direct voltage with minimum losses into a direct voltage of lower magnitude. Figs. 1a to 1d exemplify two possibilities of such conversion. The feeder voltage $U_1$ is periodically chopped into individual voltage sections of the duration $T_e$, with intermediate pauses or break intervals $T_a$.

The chopping operation can be effected by means of an apparatus according to Figs. 2a or 2b. In Fig. 2a the load resistor $R_L$ is connected to the plus and minus buses of a direct-current line supplying the voltage $U_1$. A magnetically controllable semiconductor member S is connected in series with the load $R_L$ and is controlled by a winding $W_S$ so that its resistance is a minimum during the make interval $T_e$ and a maximum during the break interval $T_a$. Accordingly, during the interval $T_e$ the voltage $U_4$ is impressed upon the load resistor, while during the interval $T_a$ the lower load voltage $U_3$ is effective. These voltage sections can be smoothed to a median value $U_2$ by means of filtering devices, for instance by the series connection of a damping resistor $R_1$ and a capacitor $C_1$ connected parallel to the load resistor $R_L$ as shown. By varying the ratio of make interval $T_e$ to break interval $T_a$, the median value of the converted voltage can be changed at will continuously between the limits $U_4$ and $U_3$, as will be recognized from Fig. 1a in comparison with Fig. 1b. However, one of the intervals, for instance the make interval $T_e$, may remain constant and the break interval $T_a$ may be varied so that the duration of the period T changes, as is represented by Figs. 1c and 1d. In apparatus according to Fig. 2 the smoothing components may be omitted in certain cases, particularly when the load $R_L$ has inherent inertia, as is the case with incandescent lamps, furnaces, motors and the like.

In order to obtain the above-described control performance of Figs. 1a and 1b, the translating apparatus of Fig. 2a is designed as follows. The magnetically responsive semiconductor member S is located in the field of a magnet structure $M_S$ excited by a bias field winding $W_B$ which is energized from the direct-current feeder line through a rheostat $R_B$ to produce an adjusted constant magnetomotive force in the system $M_S$. The control winding $W_S$ is inductively linked with the magnet structure $M_S$ and is energized through a rectifier $G_S$ from a suitable source of alternating voltage of the desired control frequency. This source is represented by an alternator $A_S$. The amplitude of the pulsating control voltage is adjusted or varied by means of a rheostat $R_S$. The load circuit is shown to include in series a feedback winding $W_F$ on the magnet structure $M_S$. The feedback winding $W_F$ coacts with windings $W_S$ and $W_B$ to produce a flip-flop characteristic of the semiconductor resistance as will be described in a later place. The component magnetomotive force of winding $W_B$ normally produces in semiconductor members a magnetic field perpendicular to the direction of the load current axis so as to reduce the resistance to a minimum. Only during one half-wave period of the pulsating control current in winding $W_S$ can this winding act in differential relation to the bias field winding $W_B$ so that at a given phase point the magnetic field strength in member S declines below a critical value at which the resistance of the semiconductor is triggered up to its maximum value, thus causing the device to "break" the load circuit. At some time thereafter, the magnetomotive force of winding $W_B$ again becomes preponderant so that the resultant field strength exceeds another critical value at which the resistance is triggered down to the minimum value thus "making" the load circuit. The phase moments at which the break and make operations occur are set or controlled by means of the rheostats $R_S$ and $R_B$.

If the control winding is energized according to the modification shown in Fig. 2b, the apparatus is suitable for operation according to Figs. 1c and 1d. The control winding $W_S$ in Fig. 2 is excited by an RC tank circuit through a glow tube G1. By varying the setting of the control rheostat $R'_S$, the break period $T_a$ can be varied, while the make period $T_c$, being determined by the ignition and extinction voltage of the glow tube G1, remains constant. Otherwise the apparatus is as shown in Fig. 2a.

In this apparatus as well as in those described below, the switching member may be formed of a symmetrically conducting semiconductor of high carrier mobility, preferably a crystalline body of a binary $A_{III}B_V$-type compound such as indium arsenide or indium antimonide, both affording a carrier mobility above 20,000 cm.$^2$/volt second. However, in the apparatus of Fig. 2, as well as in those described below, the switching member may also be formed by a semiconductor of the magnetic barrier type, it being then necessary of course to observe the proper polarities of the voltages and the electromotive forces of the resistance controlling field windings of the semiconductor device. When thus providing a semiconductor of the magnetic barrier type, its semiconducting substance may have a lower carrier mobility and consists preferably of germanium, although the above-mentioned indium compounds, as well as other semi-conducting materials, including those previously mentioned in this specification, are also applicable. For securing the magnetically controllable valve or rectifying effect, the semiconductor member is so prepared as to have a surface of high surface recombination opposed to a surface or portion of low surface recombination. This is done either by applying a surface treatment (see the above-mentioned copending application Serial No. 297,788) and/or by giving the semiconductor body a particular shape as disclosed in the above-mentioned copending application Serial No. 495,007. For instance, relating to Fig. 2a, the following design is applicable.

One of the vertical surfaces of the semiconductor crystal extending parallel to the current-flow direction is given high surface recombination by grinding and polishing that surface to mirror finish. The other vertical surface parallel to the current flow is given low surface recombination by etching. This is done, for instance, by anodically treating the surface in an electrolytic bath. Suitable as such a bath in the case of germanium is diluted caustic soda with some addition of hydrogen peroxide.

In such a semiconductor member, the electron-hole pairs become crowded near the surface of high recombination so that a carrier-depleted zone, i. e. the magnetic barrier layer, is formed in the zone of low recombination. This effect has the result that the semiconductor has high resistance to current flow in one direction and low resistance in the other direction, depending upon the polarity of the applied magnetic field. Hence, the rectifying action can be reversed by reversing the magnetic field polarity. This barrier effect is increased by giving the high-recombination surface a larger area than the low-recombination surface or reducing the latter surface to zero as described in the above-mentioned application Serial No. 495,007; but this need not herein be further described because the particular design of the magnetic-barrier device is not essential to the present invention proper.

The semiconductor member is dimensioned in accordance with the required resistance and power values. For controlling high power values, it may be necessary to subdivide the member into a number of individual crystal or/and to provide them with cooling fins or other cooling means. The individual crystals are interconnected in series or parallel depending upon the load requirements.

Another important application of the invention is for the conversion of direct current into alternating current. Such a conversion can be obtained in accordance with the method exemplified by Fig. 3. During each half-wave to be formed, the feeder voltage is interrupted or chopped several times and the ratio of make and break intervals is so varied during the half-wave period that the corresponding median voltage value $U_2$ corresponds to a sinusoidal half-wave, a reversal of polarity being required after each half-wave.

Suitable for this method are apparatus as exemplified by Figs. 4 and 5. The apparatus according to Fig. 4 comprises a transformer 1 with a primary center tap and two controllable semiconductor member $S_1$, $S_2$ which have respective control windings $W_{S1}$ and $W_{S2}$ excited from a common control device 2. The control device 2 is shown energized from the secondary side of the transformer 1, but it may also be energized from both sides of the transformer or, if desired, from a separate current source. The control device 2 has the purpose to open and close the semiconducting switching members $S_1$ and $S_2$ in a given rhythm. That is, for producing a half-wave of alternating current, the member $S_1$ is opened in the rhythm apparent from Fig. 3, while the member $S_2$ is kept blocked. For forming the other half-wave, the switching member $S_2$ performs the chopping operation in the required rhythm, while the switching member $S_1$ remains blocked. By suitable smoothing effected, for instance, by means of a capacitor parallel to the output terminals, a sinusoidal alternating voltage is produced whose frequency is determined by the control device 2 and hence can be varied and adjusted practically at will. If, as in the illustrated embodiment, the alternating-current output circuit is given a definite natural frequency, then, as more fully explained below, the converting device is self-exciting at this natural frequency. The operation of the apparatus according to Fig. 4 will presently be explained more in detail.

Assume that at a moment of observation the switching member $S_2$ is gradually approaching the trigger condition and is about to break its circuit. At that instant the terminal $v_1$ has a given positive voltage. This voltage is inductively imparted to the terminal $v_2$. The control winding $W_{S2}$ receives from the alternating voltage source $A_S$ through a rectifier bridge 101 a rectified current which pulsates between zero and maximum. This half-wave current, if alone effective, would close the switching member $S_2$ almost during the entire half-wave period so that member $S_2$ could open its circuit for a short interval of time only in the saddle portions of the voltage curve between two consecutive voltage half-waves. However, at the moment under observation the current driven by the voltage $v_2-u_2$ through the resistor $r_3$, the control winding $W_{S2}$ and the resistor $r_4$ has a direction opposed to that of the current flowing through the resistor $r_5$ and, therefore, increases the interval of time during which the member $S_2$ will open. This causes the voltage at terminals $u_2$, $v_2$ and the break interval of member $S_2$ to increase until member $S_2$ remains open during the entire period of time. Due to the oscillating circuit formed between terminals $u_2$ and $v_2$ by an adjustable capacitor C, and an inductance coil L, the voltage between terminals $u_2$ and $v_2$ has the shape of a sine wave. Hence, this voltage declines after passing through a maximum value. This causes the current through components $r_3$, $W_{S2}$, $r_4$ to again decrease so that member $S_2$ has blocking action during an increasing proportion of the time until, at the voltage $u_2-v_2=0$ the member is almost completely blocked. Then the potential of terminal $v_2$ turns negative and the same cycle of operation takes place at the switching member $S_1$ so that now current can flow through components $r_1$, $W_{S1}$, $r_2$ during an increasing proportion of time during each half-wave period of the voltage supplied from source $A_S$.

By varying the tank circuit, that is by changing the adjustment of capacitor $C_{11}$, the frequency of the alternating voltage taken from terminals $u_2$, $v_2$ can be varied without changing the voltage amplitude.

In an apparatus according to Fig. 1, a feedback coupling may be used in the same manner as explained with reference to Fig. 2a. Also in accordance with Fig. 2a, a capacitor in series with a resistor may be connected between the terminals $o$ and $v_1$, and another such series connection may be connected between the terminals $o$ and $u_1$. These capacitor-resistor shunt circuits serve not only for smoothing purposes but they also facilitate the break operation (according to Fig. 4b of our copending application Serial No. 491,983, filed March 3, 1955, for Apparatus for the Switching of Electric Power Circuits Without Contacts, assigned to the assignee of the present invention) as will be explained below with reference to Figs. 18 to 20.

If the performance of the system of Fig. 4 is to be obtained with transistors instead of the illustrated magnetically controllable semiconductors, then the control effect upon each individual transistor is to be produced, instead of by a magnet winding $W_{S1}$, $W_{S2}$, by supplying the corresponding control currents to the control electrodes of the transistor. It will be understood that the same possibility of applying transistors also applies to all other embodiments of the present invention, an example being described below with reference to Fig. 18a.

The apparatus according to Fig. 5 performs the same converting operation as that of Fig. 4 without requiring an intermediate transformer. Instead of only two rapidly acting switching members, four such members, namely those denoted by $S_2$ to $S_4$, are employed in a bridge network. The members $S_1$ and $S_3$ connect the left-hand side of the load resistor $R_L$ alternately with the plus and minus buses of the direct current feeder line. Th apparatus of Fig. 5 requires a control device, not illustrated, which operates like that of Fig. 4, except that it acts simultaneously on two corresponding members $S_1$ and $S_4$, or $S_2$ and $S_3$.

A conversion of direct current into three-phase alternating current can be effected in an analogous manner, for instance by connecting six switching members in a three-phase network.

Figure 6B:
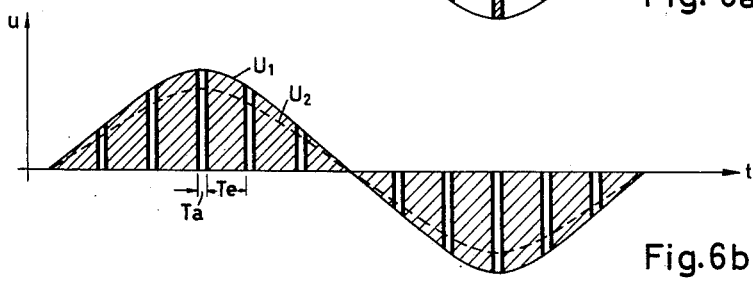

Another important application of the invention is for the conversion of alternating current into alternating current of different voltage or different frequency. For instance, according to Figs. 6a and 6b, the effective or median value during each half-wave of an alternating current or alternating voltage is controlled by repetitively chopping the current or voltage during each half-wave without changing the feeder frequency. Fig. 6a shows the adjustment of a low median value $U_2$ of the voltage derived from a feeder voltage $U_1$ through the rapidly acting members. For comparison, Fig. 6b shows a control condition in which a relatively high median voltage value $U_2$ is obtained. The two control conditions differ in that the ratio of make to break intervals is relatively small in Fig. 6a but relatively large in Fig. 6b. The chopping frequency is the same in both cases. For obtaining the median value $U_2$ it is preferable to smoothen the upper harmonics of the high control frequency at the load resistor. The circuit connection may correspond to Fig. 2, except that the apparatus is energized by alternating voltage instead of direct voltage. This fundamental and simple circuit connection requires that the switching member S be conductive in both directions of current flow, a requirement readily satisfiable with semiconducting resistance members. It will be recognized that a converting apparatus operating according to Figs. 6a and 6b functions much like a continuously regulatable transformer.

Figure 7:
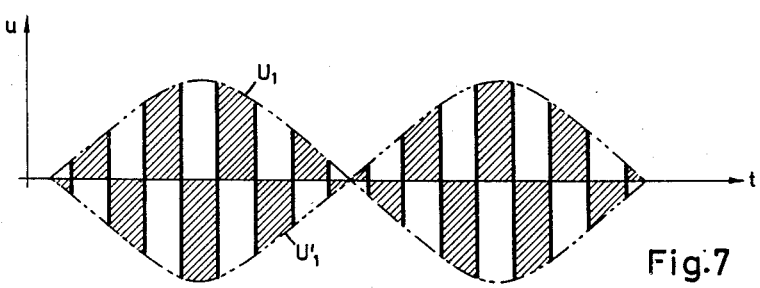
Figs. 7 and 8 are further voltage diagrams relating to a method for changing the frequency of alternating voltage.
Figure 8:
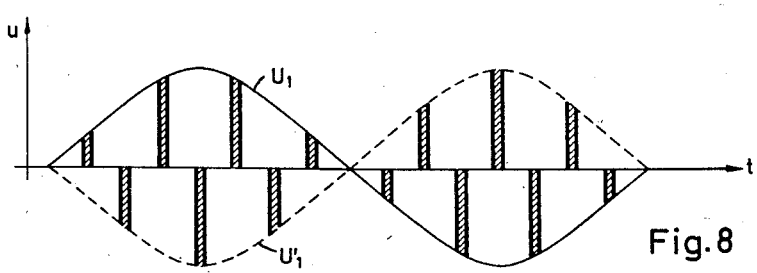

By reversing the polarity of the voltage sections during each second half-wave, a direct current of controllable median value can be obtained. However, an alternating current can also be converted by chopping into an alternating current of a higher frequency which is modulated by the alternating input current. This method is illustrated in Figs. 7 and 8. According to Fig. 7 the half-waves of the input current are chopped into individual sections, and these sections are alternately reversed in polarity relative to the load. The sine wave of the input voltage is shown at $U_1$. The polarity-reversed sine wave is shown at $U'_1$. In this way a new, modulated alternating voltage of higher frequency is produced, this voltage being indicated by hatched areas.

For performing this method, an apparatus according to Fig. 4 or Fig. 5 may again be used, with the exception that the illustrated direct-current terminals are to be connected to an alternating voltage and the two switching members $S_1$, $S_4$ and $S_2$, $S_3$ are alternately controlled by the control device 2 so that one switching member or pair of members opens its circuit at the moment when the other member or pair closes, and vice versa.

Fig. 8 also exhibits how, additionally, the voltage of the higher frequency can be controlled by reducing the width of the individual voltage sections relative to the values shown in Fig. 7, thus producing a correspondingly smaller median value for the individual sections. If the width of the voltage sections remains constant but their time spacing is changed, then a change in frequency is obtained aside from the change in voltage magnitude. The polarity reversal may also be effected after the elapse of several voltage sections. In all cases in which the input voltage is alternating, the translated voltage may be smoothed by resonance circuits tuned to the output frequency.

Such conversions are applicable for the regulation or control of a transformed alternating voltage for purposes conventionally served by a regulating transformer of controllable transforming ratio, for instance in stage lighting regulators. While heretofore the regulating transformer had to be designed and rated for the basic frequency of the alternating feeder voltage, the application of the novel transforming method according to Figs. 7 and 8 permits giving the transformer a considerably smaller rating, because it need be designed only for the higher frequency. For various purposes, for instance the operation of fluorescent lamps, the higher frequency is inherently more favorable in addition to the above-mentioned advantages. Further advantages are afforded in cases where it is desired to simultaneously control spacially extensive consumer networks. Then a relatively small transformer can be used for transforming the total power consumption up to a high voltage, and this voltage can be transformed down to the consumer voltage at the individual consumer localities, a gain by relatively small transformers. One of the cases where this is desirable is the illumination of airports. If it is undesired to apply a high frequency to the consumer, a demodulation of the modulated alternated voltage of high frequency back to the original frequency may be effected after voltage transformation. As well known, such a demodulation is effected by rectifying the modulated voltage and reversing the polarity of the rectifier in synchronism with the fundamental frequency. Particularly suitable for this purpose are controllable semiconductors of the magnetic barrier type.

Figure 9:
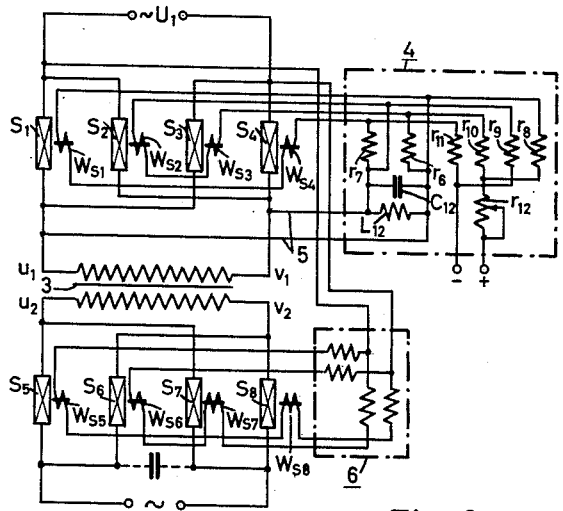
Fig. 9 is the circuit diagram of a frequency changer capable of operating in accordance with Figs. 7 and 8.

The system of Fig. 9 presents an example for a modulating and demodulating operation comprising controllable semiconducting resistors as switching elements and equipped with an intermediate transformer. The modulator portion of the system comprises semiconductor members $S_1$ to $S_4$ connected to the supply voltage $U_1$ of the basic frequency, and corresponds substantially to the apparatus according to Fig. 5, except that the load resistor is formed by the primary winding of the intermediate transformer 3.

The demodulator portion of the system comprises the controllable semiconductor members $S_5$ to $S_8$ and is connected to the secondary winding of transformer 3. The demodulator portion has the same design as the modulator portion. It is assumed that the semiconductor members $S_1$ to $S_8$ are controllable semiconductors of the magnetic barrier type as described with reference to Fig. 2. The members are magnetically controlled by respective control windings $W_{S1}$ to $W_{S8}$.

For securing the modulating performance represented in Figs. 7 and 8, a corresponding control must be applied to the switching members $S_1$ to $S_4$. This is done by means of a control device 4 which comprises an oscillatory circuit which is composed of a capacitor $C_{12}$ and an inductor $L_{12}$ and is tuned to the modulation frequency. This tank circuit is excited from the input frequency of the modulator through leads 5. The voltage of the tank circuit controls, through resistors $r_6$, $r_7$ and through the windings $W_{S1}$ and $W_{S4}$, or $W_{S2}$ and $W_{S3}$, the switching members $S_1$, $S_4$ or $S_2$, $S_3$ in alternate sequence in the sense of a self-excited oscillation generator at a higher frequency than that of the line voltage $U_1$. The higher-frequency voltage thus impressed upon the terminals $u_1$, $v_1$ which is modulated by the line frequency, can be varied as regards the areas (voltage-time integrals) of the individual voltage pulses according to Fig. 8, by varying the setting of the resistor $r_{12}$ which controls the direct-current flowing through resistors $r_8$ to $r_{11}$ and premagnetizing the control windings $W_{S1}$ to $W_{S4}$. The modulator thus operates as a self-excited oscillation generator. As mentioned above with reference to Fig. 5, the two corresponding switching members $S_1$ and $S_4$, or $S_2$ and $S_3$ are controlled simultaneously in the same sense. The transformation of the modulated voltage of the higher frequency is effected by the transformer 3 which need be dimensioned only for the higher frequency and hence can be given a smaller and cheaper design of smaller losses as compared with a regulating transformer for the same power requirements and the same fundamental frequency.

The demodulating members $S_5$ to $S_8$ are likewise semiconductors of the magnetic barrier type. They are connected in a rectifier bridge network and their inverse direction (blocking direction) is simply reversed by a control device 6 at the frequency of the alternating voltage $U_1$. As mentioned, semiconductor devices of the magnetic barrier type operate similar to a rectifier when subjected to a magnetic field of a given magnitude and a given direction. Accordingly, the control device 6 has only the task to reverse the direction of the magnetic field at each moment of the zero passage of the basic frequency. In the simplest case, the excitation of the control windings $W_{S5}$ to $W_{S8}$ for the demodulating members $S_5$ to $S_8$ may be effected directly by the alternating voltage $U_1$ of the fundamental frequency, ohmic resistors for shortening the time constant being interposed if desired. The transformed voltage of the basic frequency, amplitude-controlled by means of the control device 4, still includes the higher modulating frequency. This superimposed frequency, however, can readily be eliminated or weakened by conventional filter means. The illustrated connection of the control devices 4 and 6 is not the only one available for controlling the modulating and demodulating portions of the system according to Fig. 9. If desired, a separate control may be employed, the higher modulating frequency being produced by any desired generating means. It is further possible, when applying semiconductors with a magnetic barrier layer, to operate, instead of with a purely magnetic control, with an electric control by means of an auxiliary electrode or by capacitively transmitting the controlling magnitude to the semiconductor.

Another translating operation of importance is the production of alternating current of variable frequency and, if desired, also of variable voltage, particularly for producing multi-phase current from direct current, alternating current or three-phase current. One way of obtaining such a frequency translation according to the invention is the provision of an envelope-curve converter generally as known in electric power engineering. With such an envelope-curve converter, the sine wave of the new fundamental frequency is formed of sections of the original sinusoidal frequency with the aid of natural commutation from one phase to the next following phase. This method can be modified so that when the voltage of the new fundamental frequency increases along the ascending portion of its half wave, a commutation or transfer from the phase of higher instantaneous voltage to a phase of lower instantaneous voltage is enforced by interruption of the preceding phase, this being illustrated in Fig. 10.

Fig. 10 relates to the formation of a fundamental low frequency by means of a six-phase translating circuit. The diagram shows the voltage waves of the six phases 1 to 6 which according to Fig. 11 are supplied from a three-phase to six-phase transformer 54 and are switched on and off by switching members $S_1$ to $S_6$. The control winding $W_{S1}$ of switching member $S_1$ is energized through a transformer 90 by an alternating voltage of the same phase as the voltage applied to the switching member $S_1$. Another voltage of lower frequency is impressed upon the control winding $W_{S1}$ through a transformer 91. This second voltage is taken from a resonance circuit composed of a capacitor 92 and an inductor 93. The control circuit of winding $W_{S1}$ further includes a controllable semiconductor 94 with a control winding 95 which is likewise excited by the voltage of the resonance circuit 92, 93. The switching member 94 suppresses relative to winding $W_{S1}$ those control currents which would open the switching member $S_1$ in the negative half-wave of the alternating voltage at the terminal $a$ as long as the voltage of transformer 91 is still positive. That is, the switching member 94 suppresses the make pulses during the positive half-wave of the alternating voltage at terminal $a$ as long as the voltage at transformer 91 is negative.

The frequency of the alternating output voltage of the system is adjustable by correspondingly adjusting the natural frequency of the resonance circuit 92, 93, for instance, by changing the capacitance setting of the capacitor 92.

The control means for the other phases of the system are the same, except that the alternating voltage for the transformer 90 is taken from the proper terminals $b$ to $f$.

The above-described control of the switching members is such that at the moment $t$, the member $S_1$ interrupts the circuit of phase 1 and the member $S_2$ closes the circuit of phase 2. At the moment $t_2$ the switching member $S_2$ breaks and the member $S_3$ makes the phase circuit, and so forth. In order to have the median value of the voltage applied to the load $R_L$ in Fig. 11 correspond to the new fundamental wave 55 shown by a broken line in Fig. 10, the time spacing between the individual switching moments $t_1$, $t_2$, $t_3$ and so forth is kept larger than ⅙ of the period of the supply voltage. Near the maximum of the new fundamental voltage wave 55, the next following phase may be permitted to be closed before the preceding phase is interrupted without causing large short circuit currents to flow through two phase windings of the transformer. This is because the voltages of each two sequential phases are practically equal in the vicinity of the switching moment. After passing beyond the maximum, the voltage of the fundamental wave 55 declines due to the delay of the make moments. The median values of the individual phase voltage sections then become negative so that the median value represents an alternating voltage.

The frequency of the new fundamental voltage wave can be adjusted by varying the time interval between the switching moments of successive phases. When this interval is made exactly equal to ⅙ of the feeder voltage frequency, then a direct voltage is produced whose magnitude depends upon the particular moment at which the switching takes place during the individual half-waves.

Consequently, the apparatus illustrated in Fig. 11 also permits converting an alternating feeder voltage into a rectified load voltage of controllable magnitude.

An apparatus according to Fig. 11 further permits a control or regulation by variable part-time conductance during each half-wave. To this end, voltage sections cut out of the successive half-waves and having different width or duration are impressed upon the power consuming load. In this manner, and as typified in Fig. 12, a periodically chopped direct current with periodically increasing and decreasing durations of the individual voltage sections is obtained so that the median voltage value shown by a broken line 56 forms a sinusoidal wave (see also Fig. 3). At the voltage zero moment of the new fundamental wave 56, the control voltage for the switching members $S_1$ to $S_6$ in Fig. 11 is preferably displaced 180° so that now the sections are cut out of the negative half-waves and the new fundamental frequency wave 56 will continue as a negative half-wave. The control device required for this purpose may be designed similar to that described above with reference to Fig. 15.

It is further possible to reverse the resistance control of the switching members so rapidly and in such a timely sequence that the chopping of the individual half-waves of an alternating voltage results in a constant median value of the individual voltage pulses. As a result, and as illustrated in Fig. 13, an alternating voltage of higher frequency and approximately constant amplitude of its fundamental wave is obtained according to the broken line 57, provided care is taken to have the make intervals decrease toward the middle of each half-wave period and increase during the second portion of that period while reversing the polarity of the individual successive voltage impulses. The upper harmonics then occurring can be suppressed by filter means as described previously.

An alternating voltage may further be translated into a direct voltage of approximately constant median value. To this end and as illustrated in Fig. 14, the individual half-waves of the alternating voltage are chopped into voltage sections in the same manner as explained with reference to Fig. 13 without reversing the polarity of the successive sections within the same half-wave, provided all voltage sections of each alternate half-wave are reversed in polarity for instance by means of a bridge network. The filter components for smoothing the output voltage are then considerably smaller than required for the conventional rectification of an alternating feeder voltage of the same frequency. This is of advantage for such applications and load circuits where the filter means for smoothing the direct current resulting from conventional rectification would cause time-delays detrimental to the load equipment to be energized. This is the case, for instance, with highly sensitive regulating devices in which the measuring value to be responded to is available as an alternating voltage which must be rectified before being applied to the regulating circuits proper.

If the feeder current used for a translating operation according to Fig. 13 is single-phase alternating, then the median value of the output voltage of higher frequency is relatively low in comparison with the amplitude of the original alternating voltage. However, as apparent from Fig. 12, the amplitudes of the new-frequency voltage are considerably larger when the same method is applied to three-phase feeder current and if care is taken, by timely commutating from each phase to the next following phase, to utilize only the peak portions of the sine wave of the fundamental-frequency voltages. It is then relatively simple to obtain for the resulting median frequency a constant amplitude because relatively slight changes in the make periods are sufficient.

If, for instance, with a method according to Fig. 15, another voltage of the same median frequency is produced and if the two voltages are imposed upon each other, then the amplitude of the resultant output voltage can be varied simply by varying the phase displacement between the two superimposed voltages. By continuously varying the phase voltage, this method can also be used for subjecting the amplitudes of the sum voltage to modulation with a new frequency. By rectifying the sum voltage and changing the polarity of rectification at the voltage zero passages, a new low frequency is obtained which can be regulated in a simple manner. A similar result is obtained by giving the two superimposed voltages somewhat different frequencies. The sum is a beat-frequency voltage whose rectification also results in furnishing a new lower frequency. It is possible therefore, in this manner to vary a lower output frequency within a wide range simply by phase displacing a high frequency.

The above-described methods for the conversion of alternating current may be applied for equalizing load peaks in distribution systems with the aid of a flywheel generator. The flywheel is driven from a motor, such as a wound rotor motor or a synchronous motor, and one of the above-described frequency changers is interposed between the driving motor and the power distribution line of the frequency $f_1$ whose load peaks are to be equalized. The frequency changer is capable of continuously converting the frequency of the line to a somewhat higher and/or somewhat lower value $f_2$ and, if desired, to also vary the voltage amplitude accordingly. For equalizing a load peak in the distribution line, the frequency value $f_2$ is lowered by gradually varying the frequency ratio so that the flywheel runs at supersynchronous speed and supplies power. In the load valleys the frequency $f_2$ is increased so that the flywheel consumes power. This control of the frequency changer can be effected in dependence upon the load of the line or upon the current or power consumption of consuming equipment. Such a system is advantageous, for instance, for the operation of reversible rolling mills, or mine hoists and other hoisting equipment which usually involves large load peaks.

In translation systems as described above, it is important for securing low losses that during the chopping operation the transition from minimum to maximum current and vice versa occurs with a minimum of losses in the switching member. To this end, the time interval during which the change in resistance occurs can be shortened. On the other hand, the same purpose can be served by subjecting the current characteristic resulting from the resistance change to modification so that the current increase during make operation is delayed and the current decline during break operation is accelerated. Such means for reducing the transitory losses are more fully disclosed in the copending application Serial No. 491,983, filed March 3, 1955, and assigned to the assignee of the present invention. However, some of such auxiliary means, applicable for the present invention, will presently be described.

For shortening the time interval during which the switching member changes its resistance from a large to a small value or vice versa, care should be taken above all to have the control effect (i. e. the conrtolling magnet field of a magnetically controllable semiconductor, or the emitter current of a transistor) vary within the shortest possible time from one to the other limit value. This can be done by applying to the switching member another control effect which triggers a flip-flop operation in response to a slight change in the control magnitude primarily applied. As a result, an instantaneous triggering from one to the other limit resistances of the switching member is secured.

Such a trigger operation can be released in the switching member of all above-described embodiments by means of a feedback coupling such as the one described with reference to feedback winding $W_B$ in Fig. 2. Due to the magnetizing action of winding $W_{B1}$ the current controlled by the semiconductor member is coupled with the resultant magnetic field acting upon the semiconductor. As a result, a flip-flop characteristic as typified in Fig. 16 is obtained. Fig. 16 shows the trigger operation for two different operating voltages $U_1$ and $U_2$. The illustrated curves represent the load current $I_L$ in dependence upon the control current $I_S$. With the operating voltage $U_1$, the resistance is triggered down to a low value, corresponding to a high load current, when the control current (in winding $W_S$ of Fig. 2) reaches the value $I_{S1}$. With a lower operating voltage $U_2$ a higher control current $I'_{S1}$ is required. Triggering from low to high resistance and hence from high to low load current takes place at a somewhat different control-current value, namely at the value $I_{S2}$ with voltage $U_1$ and at the value $I'_{S2}$ with voltage $U_2$. The flip-flop characteristics, as regards shape and mutual spacing, are dependent upon the ratio of the load resistance to the two limit resistances of the semiconductor device and also upon the selected intensity of the feedback coupling. Consequently, these parameters are preferably so tuned to one another that most favorable flip-flop characteristics, for instance a small difference between the current values $I_{S1}$ and $I_{S2}$, is secured.

If the operating voltage varies in accordance with a sine wave, as is the case with the alternating current in utility lines, then it is obvious that the value of control current at which the trigger operation commences will also vary versus time together with the operating voltage. This dependence upon time can be represented by the ignition characteristics Z and the extinction characteristics L shown in Fig. 3. When using semiconductor devices of the magnetic barrier type for the chopping operation, so that the magnetic field which effects the increase in asymmetrical resistance must have a given direction, then the control of an alternating voltage by means of such a barrier device requires that the field-controlling currents also reverse their direction at the moments when the alternating voltage reverses its polarity. Then, the ignition and extinction characteristics for the negative half-wave of the alternating voltage are mirror-symmetrical to those of the positive half-wave as is also apparent from Fig. 17.

For varying the time curve of the current during make and break operation of the voltage-chopping switching members for the purpose of reducing the transition losses, the current increase during the make operation may be delayed and the current decrease during the break operation may be accelerated. For delaying the current increase during make operation, the load circuit to be switched can be given a temporary inductive character. For accelerating the current decrease during break operation, the circuit can be given a capacitive character. While this is also described in the above-mentioned copending application Serial No. 491,983, filed March 3, 1955, several examples applied to translating apparatus according to the present inventions are shown in Figs. 18 to 20 and described presently.

For chopping an alternating current in translating apparatus according to the invention, it is of advantage for some applications to provide for a mixed ohmic-inductive load as shown in Fig. 18. The load is characterized by the ohmic resistance $R_L$ and the inductivity $L_L$. The switching member for chopping the voltage is designated by S, and it is assumed that it consists of a magnetically controllable semiconductor device. Connected in parallel relation to the ohmic-inductance load $R_L$, $L_L$ is a capacitor C in series with a valve or rectifier V of reversible current-flow direction. This valve may consist of a semiconductor with a magnetic barrier layer whose controlling magnetic field is reversed in polarity depending upon the alternating feeder voltage so that both half-waves of the alternating feeder voltage are blocked from flowing through the semiconductor member. The member S is controlled in synchronism with the chopping frequency. During make operation, that is when triggering the semiconductor member down to minimum resistances, the inductor L acts to retard the increase in current, and the flow of current through the capacitor C is then prevented by the valve V. During make operation, the capacitor C is charged through the residual resistance of the valve V; and during break operation the capacitor voltage acts upon the switching member S as a counter voltage so that the current declines more rapidly than the semiconductor resistance. Thus, during break operation the load circuit behaves like a capacitive load, and the current through the switching member S declines more rapidly than without the presence of the capacitor C.

Fig. 19 relates to the case of a mixed ohmic-capacitative load. The alternating feeder voltage is chopped into voltage sections by means of the switching element S. For retarding the increase in current during make operation, an inductivity L is connected in series with the load represented by an ohmic resistor $R_L$ and a parallel connected capacitor $C_L$. In order to have the capacitive component $C_L$ of the load act during break operation in the sense of an accelerated decline in current, a polarity reversible valve V is connected parallel to the inductivity L. The valve V is controlled in the same manner as described with reference to the valve V in Fig. 18.

In the example of Fig. 20 the load $R_L$ is purely ohmic. For delayed current increase during make operation, an auxiliary inductivity L is connected in series with the load $R_L$, and for accelerated current increase during break operation an auxiliary capacitance C is connected parallel to the load $R_L$ and the auxiliary inductivity L. A polarity reversible valve V is connected in series with the capacitor C and is controlled in the manner described with reference to Fig. 18.

The auxiliary components described with reference to Figs. 18 to 20 and other devices of similar operation as described in the above-mentioned copending application Serial No. 491,983, filed March 3, 1955, are applicable in conjunction with any of the other translating apparatus according to the invention.

While in the foregoing we have described semi-conductor devices as voltage-chopping components of translating apparatus according to the invention, it is for some applications also possible to use high-vacuum tubes instead of the semiconductors, although such tubes are less rugged and have a high residual resistance when conducting. For instance, such tubes may be used as switching members $S_1$ to $S_8$ in such systems as shown in Fig. 9. In that case, when applying high-vaccum tubes for power translation, flip-flop phenomena are less significant and need not be used. It will be understood that in all cases where the switching member is required to conduct in both directions of current flow, two vacuum tubes must be used in anti-parallel connection. The ignition and extinction characteristics of the negative half-wave as shown in Fig. 17 then relate to the second vacuum tube of the anti-parallel connection.

It will be apparent to those skilled in the art, upon a study of this disclosure, that our invention permits of various modifications and applications other than those specifically set forth herein, without departing from the essential features of our invention and within the scope of the claims annexed hereto.

We claim:

1. Electric power translating apparatus, of low losses and low wattless power, comprising voltage supply means, power consuming load means, a static switching device of controllable resistance connected to said supply means in series with said load means, said device having periodic resistance control means for controlling said device to chop said voltage at the control-means frequency into individual voltage sections, and means for controlling the ratio of the make and break intervals of said static device to adjust the median values of said individual voltage sections in accordance with the desired time characteristic of the translated voltage of said load means.

2. Electric power translating apparatus, of low losses and low wattless power, comprising voltage supply means, a load circuit connected between said supply means and having a power consuming load and a static switching device connected with each other, said static device having a resistance continuously variable between a substantially insulating maximum and a power-current conducting minimum to make and break the load circuit and having a break moment time-displaceable independently of the voltage, and said device having periodic control means for controlling said resistance to chop said voltage at the control-means frequency into individual voltage sections, and means for controlling the ratio of the make and break intervals of said static device to adjust the median values of said individual voltage sections in accordance with the desired time characteristic of the translated voltage of said load means, and filter means connected with said load circuit for suppressing upper harmonics.

3. Electric power translating apparatus, of low losses and low wattless power, comprising voltage supply means, a power-consuming load circuit connected to said supply means, a static translating device having a controllable semiconductor member connected in said load circuit and having a resistance variable between maximum and minimum values for substantially breaking and making said load circuit, said translating device having periodic control means for controlling said resistance to chop said voltage at the control-means frequency into individual voltage sections, and means for controlling the ratio of the make and break intervals of said static device to adjust the median values of said individual voltage sections in accordance with the desired time characteristic of the translated voltage of said load means of said load circuit.

4. In translating apparatus according to claim 3, said control means comprising a magnet field structure having a field traversing said semiconductor member and having a field-control winding and alternating-current supply means connected with said winding.

5. Electric power translating apparatus, of low losses and low wattless power, comprising voltage supply means, a power-consuming load circuit connected to said supply means, a static translating device having a controllable resistance member connected with said load circuit and having periodic resistance control means for abruptly varying the resistance of said member between make and break values to chop said voltage at the control-means frequency into individual voltage sections, and said translating device having control means for varying the width of said voltage sections to adjust the median values of said individual voltage sections in accordance with the desired time characteristic of the translated voltage of said load circuit.

6. In translating apparatus according to claim 1, said resistance control means comprising a source of variable frequency and frequency control means for adjusting the frequency of said make and break intervals.

7. In translating apparatus according to claim 3, said switching device having a flip-flop resistance characteristic, and said resistance control means comprising a feed-back coupling responsive to the resistance change of said switching device for triggering said characteristic between the limit values of said characteristic.

8. In translating apparatus according to claim 3 said resistance control means comprising a source of variable control voltage of a desired frequency and another source of superimposed voltage of a higher frequency and substantially triangular wave shape.

9. Translating apparatus according to claim 3, comprising a plurality of said switching devices in series with said load means and interconnected in push-pull relation and both controlled by said resistance control means to chop the supply voltage into voltage sections and periodically reverse the polarity of said sections.

10. Electric power translating apparatus, comprising a direct-current feeder line, power consuming load means connected to said supply, a static switching device having a plurality of switching members of abruptly variable resistance connected in push-pull relation to each other between said load means and said supply, and a control device connected with said switching members and having alternating-voltage means for controlling said switching members to chop the direct-current feeder voltage at the frequency of said alternating-voltage means into individual voltage sections, and said control device having adjusting means for varying the ratio of make to break intervals of said switching device to thereby change the magnitude of the translated output voltage impressed upon said load means.

11. The method of translating the voltage supplied to a load from an alternating-voltage power supply through a static control device of variable resistance, which comprises periodically varying the resistance of the static device abruptly between minimum and maximum to make and break the power supply at a given control frequency whereby the supply voltage is chopped into a sequence of intermittent voltage sections, applying the voltage sections to the load, controlling the median values of the individual voltage sections, and reversing the polarity of the voltage sections in synchronism with the alternating supply voltage, whereby the load is energized by direct current of controllable median value.

12. Electric power translating apparatus, comprising a voltage supply line, a power transformer having a secondary and having two opposingly related primary windings connected across said supply line, two semiconductor devices of magnetically responsive resistance interposed between said supply line and said individual winding portions, said semiconductor devices having respective magnet-coil circuits for periodically triggering said resistance between minimum and maximum values to chop the voltage of said winding portions into voltage sections, and a control device common to said two circuits and having alternating-voltage supply means of a desired frequency for alternately controlling the chopping operation of said respective devices, and load-circuit means connected with said secondary of said transformer.

13. Electric power translating apparatus, comprising a voltage supply line, load means, four semiconductor devices of controllable resistance, a bridge network having four branches connected in series with one another and formed by said respective devices, said network having an input diagonal connected across said supply line and an output diagonal connected with said load means, said semiconductor devices having respective resistance control circuit for periodically varying said resistance between minimum and maximum values to chop the voltage in said respective branches into voltage sections, and a control device having a supply of alternating control voltage and including said four control circuits in two phase-opposed pairs.

14. Electric power translating apparatus, comprising a voltage supply line, a power transformer, a plurality of semiconductor devices of controllable resistance connected between said supply line and said transformer in push-pull relation to each other, said semiconductor devices having respective control circuits for triggering said resistance between minimum and maximum values for chopping the supply voltage into voltage sections, control means common to said control circuits for varying the median values of the individual voltage sections whereby the supply voltage is translated into modulated voltage of said transformer, said transformer having a secondary winding, a bridge network of controllable rectifiers, said network having input terminals connected to said secondary winding and having output terminals, a demodulator control device connected with said rectifiers for periodically reversing the output polarity of said network, said latter device having alternating-current supply means for providing demodulated output voltage at said output terminals.

15. In translating apparatus according to claim 14, said controllable rectifiers being formed by semiconductor devices having respective semiconductor members connected in said bridge network and having respective control circuits connected with said demodulator control device.

16. In translating apparatus according to claim 14, said supply line voltage being alternating, and said other current supply means of said demodulator control device being connected with said supply line so that said output voltage has the same frequency as said supply-line voltage.

17. Electric power translating apparatus comprising a multi-phase alternating-voltage supply means, power consuming load means, a group of static switching devices of controllable resistance connected in the respective phases of said supply means in series with said load means, said switching devices having periodic resistance control means for controlling said devices to chop said voltage at the control frequency into individual voltage sections; and static switching members of controllable resistance connected with said group for controlling the median values of said voltage sections, said switching members having a frequency of resistance variation lower than that of said voltage supply means, whereby a consecutive series of said voltage sections is composed to form a load voltage wave of lower frequency than said supply voltage.

18. Power translating apparatus according to claim 17, comprising polarity control means connected with said static switching devices in each phase of said voltage supply means to reverse the polarity of each alternate voltage section in said phase.

19. In electric power translating apparatus according to claim 1 wherein the supply voltage of said supply means is alternating and the translated voltage of said load means is a direct voltage, said static switching devices having make periods inversely proportional to the instantaneous value of said supply voltage, and said control means having polarity reversing means for reversing the polarity of said voltage sections of each second half-wave of the fundamental frequency of said supply voltage, whereby the resulting direct voltage is poor in upper harmonics of twice said fundamental frequency.

No references cited.